US006624871B1

(12) United States Patent
Kim (10) Patent No.: US 6,624,871 B1
(45) Date of Patent: Sep. 23, 2003

(54) LIQUID CRYSTAL DISPLAY AND METHOD FOR REMOVING PATTERN DEFECTS

(75) Inventor: Yong Wan Kim, Kumi-shi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/468,354

(22) Filed: Dec. 21, 1999

(30) Foreign Application Priority Data

Feb. 5, 1999 (KR) .............................................. 99-3887

(51) Int. Cl.[7] .............................................. G02F 1/1333
(52) U.S. Cl. ........................ 349/192; 349/54; 349/122; 438/30
(58) Field of Search .......................... 349/192, 54, 148, 349/139, 55, 138, 122, 38; 438/30

(56) References Cited

U.S. PATENT DOCUMENTS

| | | | |
|---|---|---|---|
| 5,963,279 A | * 10/1999 | Taguchi | 349/54 |
| 6,064,456 A | * 5/2000 | Taniguchi et al. | 349/113 |
| 6,091,466 A | * 7/2000 | Kim et al. | 349/43 |
| 6,157,430 A | * 12/2000 | Kubota et al. | 349/147 |

* cited by examiner

Primary Examiner—Robert H. Kim
Assistant Examiner—Andrew Schechter (74) *Attorney, Agent, or Firm*—McKenna Long & Aldridge LLP (57) ABSTRACT

A method of removing pattern defects in a liquid crystal display more particularly, a liquid crystal display having an IOP structure where a transparent conductive layer is formed on a passivation layer, removes pattern defects in active layers or data wires of an LCD simultaneously and quickly, without causing any damage on other parts of the LCD, by exposing pattern defects in the air, then carrying out an etching process in use of pixel electrodes and an etch-stop layer as an etch mask. The method of removing pattern defects in a liquid crystal display, wherein the liquid crystal display comprises a gate wire on a substrate wherein the gate wire includes a gate electrode and gate line, a gate insulating layer covering an exposed surface of the substrate including the gate wire, a data wire on the gate insulating layer wherein the data wire includes a data line, source electrode, and drain electrode, an active layer on the gate insulating layer wherein the active layer constitutes a thin film transistor with the gate, source, and drain electrodes which are properly overlapped one another, a passivation layer covering an exposed surface of the substrate except a portion of the data wire, and a pixel electrode on the passivation layer wherein the pixel electrode is connected to the exposed data wire, includes the steps of forming an etch-stop layer covering the data wire and thin film transistor, exposing at least one pattern defect by etching the passivation layer in use of the etch-stop layer and pixel electrode as an etch mask, removing the pattern defect, and removing the etch-stop layer.

6 Claims, 8 Drawing Sheets

LIQUID CRYSTAL DISPLAY AND METHOD FOR REMOVING PATTERN DEFECTS

This application claims the benefit of Korean Patent Application No. 1999-3887, filed on Feb. 5, 1999, which is hereby incorporated by reference.

BACKGROUND OF THE INVENTION

1. Field of the Invention

The present invention relates to a liquid crystal display and a method of removing pattern defects thereof, more particularly, to a method of removing pattern defects (poor patterns) of a liquid crystal display having an IOP structure, where a transparent conductive layer is formed on a passivation layer.

2. Description of the Related Art

Data lines or active layers for liquid crystal display (hereinafter abbreviated LCD) are formed by depositing a conductive or semiconductor layer on an exposed surface of a substrate, then etching the deposited layer by photolithography. Residue may remain at an unwanted place if the layer is not properly patterned during photolithography. The residue of the conductive or semiconductor layer remaining as pattern defects (poor patterns) on the substrate may cause an electrical malfunction of the LCD. Therefore, an LCD in which pattern defects are removed after fabrication is typically used as a final product. Otherwise, LCDs which are unrepairable are wasted.

Figure 1:
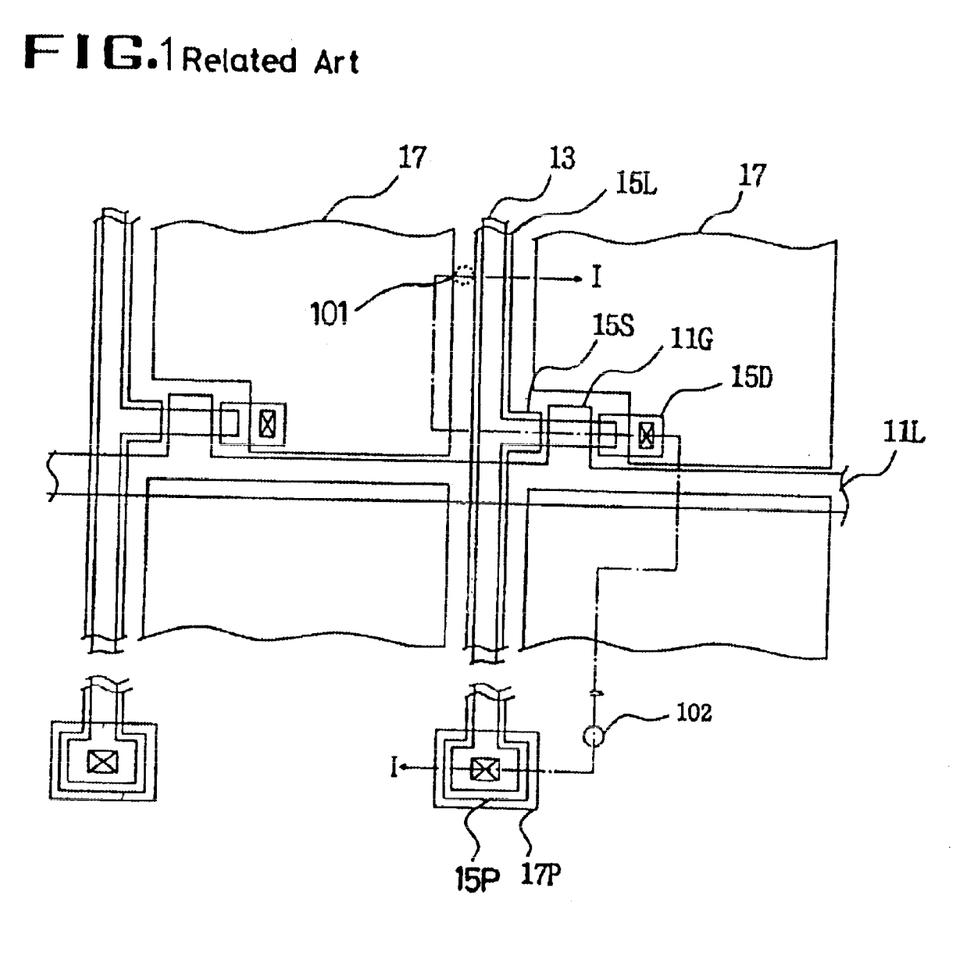
FIG. 1 shows a layout for explaining a method of removing pattern defects in LCD according to a related art.
Figure 2:
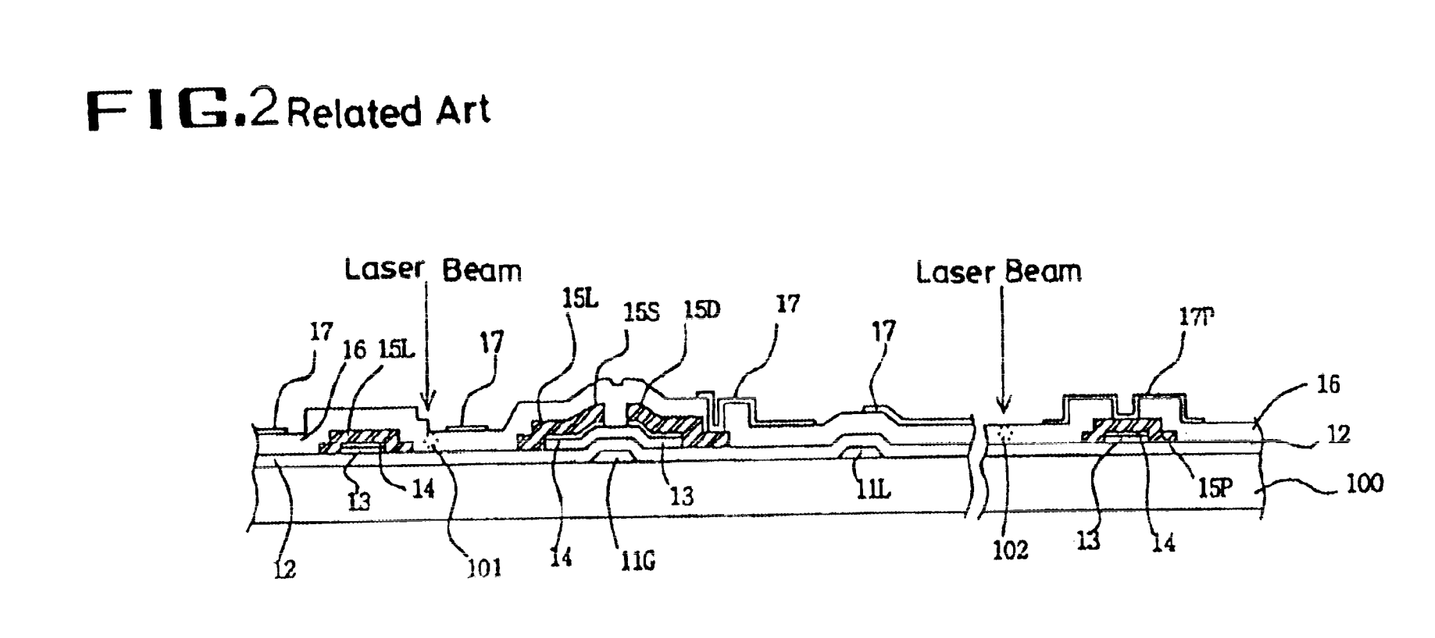
FIG. 2 is a cross-sectional view of the LCD of FIG. 1 bisected along with the cutting line I—I.

FIG. 1 shows a layout for explaining a method of removing pattern defects in an LCD according to a related art, and FIG. 2 is a cross-sectional view of the LCD bisected along with the cutting line I—I in FIG. 1.

Referring to FIG. 1 and FIG. 2, a plurality of pixel cells are defined by the places where gate lines 11L and data lines 15L cross each other. A thin film transistor (hereinafter abbreviated TFT) and a pixel electrode 17 are formed in each pixel cell. A data signal transmitted through the data line 15L is transferred to the pixel electrode 17 by switching characteristics of TFT.

As shown in FIG. 2, a gate wire, including a gate electrode 11G and a gate line 11L, is formed on a substrate 100, and a gate insulating layer 12 covers an exposed surface of the substrate including the gate wire. An active layer 13, which follows along with the data line 15L, is formed on the gate insulating layer 12 over the gate electrode 11G.

A data wire is formed over the substrate including the active layer 13. The data wire consists of: the data line 15L crossing the gate line 11L to define a plurality of pixel cells; a source electrode 15S protruding out from the data line 15L; a drain electrode 15D standing face to face opposite the source electrode 15S, and a data pad 15P at the end of the data line 15L.

A passivation layer 16 covers an exposed surface of the structure, except for portions of the drain electrode 15D and data pad 15P. A pixel electrode 17 connected to the drain electrode 15D and a data covering layer 17P covering the data pad 15P are formed on the passivation layer 16.

In the above-structured LCD, pattern defects 101 and 102 may be generated, for example, when a portion of the active layer or data wire pattern remains at the site between the data line 15L and pixel electrode 17, or the space between the data pads 15P.

Remaining unwanted locations of electrically-conductive pattern defects generated from the active layer or data wire may degrade or impair the electrical function or performance of the LCD. Therefore, a process for removing the pattern defects is necessary.

One method of the related arts of removing pattern defects, is to irradiate a laser beam on a predetermined portion of the device. For instance, as shown in FIG. 2, an LCD is repaired by irradiating laser beams to the pattern defects 101 and 102 to be cut selectively. Namely, the passivation layer 16 and pattern defects 101 and 102 are removed by being irradiated by laser beams.

The method of removing pattern defects in an LCD according to the related art which uses laser, beams is effective provided that the pattern defects exist locally. Unfortunately, the related art is less effective when the sizes of the pattern defects are large, or when the pattern defects are distributed over a relatively large area and various places, because it takes a long time to remove them individually by laser beams. Moreover, wires near the pattern defects are damaged, when pinpoint laser irradiation is not expected, as each pattern defect must be irradiated by each laser beam.

SUMMARY OF THE INVENTION

Accordingly, the present invention is directed to a liquid crystal display, and a method of removing pattern defects thereof, that substantially obviates one or more of the problems due to limitations and disadvantages of the related art.

An object of the present invention is to provide a liquid crystal display and a method of removing pattern defects thereof which removes pattern defects in active layers or data wires of an LCD simultaneously and quickly, without causing any damage to other parts of the LCD. According to the invention, this object may be accomplished by exposing pattern defects in the air, then by carrying out an etching process using pixel electrodes and an etch-stop layer as an etch mask.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention provides a method of removing pattern defects in a liquid crystal display, wherein the liquid crystal display comprises; a gate wire on a substrate, the gate wire including a gate electrode and gate line; a gate insulating layer covering an exposed surface of the substrate including the gate wire; a data wire on the gate insulating layer, the data wire including a data line, source electrode, and drain electrode; an active layer on the gate insulating layer, the active layer constituting a thin film transistor with gate, source, and drain electrodes which properly overlap one another; a passivation layer covering an exposed surface of the substrate except a portion of the data wire; and a pixel electrode on the passivation layer wherein the pixel electrode is connected to the exposed data wire. The method includes the steps of forming an etch-stop layer covering the data wire and thin film transistor, exposing at least one pattern defect by etching the passivation layer, using the etch-stop layer and pixel electrode as an etch mask, removing the pattern defect, and removing the etch-stop layer. The etch-stop layer also may be extended to cover the pixel electrode.

In another aspect, the present invention includes: a substrate; a gate wire on the substrate, the gate wire including a gate electrode and gate line; a gate insulating layer covering an exposed surface of the substrate, including the gate wire; a data wire on the gate insulating layer, the data wire including a data line, source electrode, and drain electrode; a thin film transistor connected electrically to the data line on the gate insulating layer, the thin film transistor including an active layer constituting a thin film transistor with gate, source, and drain electrodes which properly overlap one another; a pixel electrode connected to the drain electrode of the thin film transistor; and a passivation layer covering the data wire and thin film transistor except the drain electrode, wherein the passivation layer is covered by the pixel electrode and exposes the gate insulating layer except portions of the gate insulating layer where the data wire, thin film transistor, and pixel electrode are formed.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 4A to FIG. 4C show cross-sectional views bisected along with the cutting line II—II in FIG. 3, for explaining a method of removing pattern defects in an LCD;

FIG. 6A to FIG. 6C show cross-sectional views bisected along with the cutting line III—III in FIG. 5 for explaining a method of removing pattern defects in an LCD.

DETAILED DESCRIPTION OF THE PREFERRED EMBODIMENTS

Reference will now be made in detail to the preferred embodiment of the present invention, examples of which are illustrated in the accompanying drawings.

Figure 3:
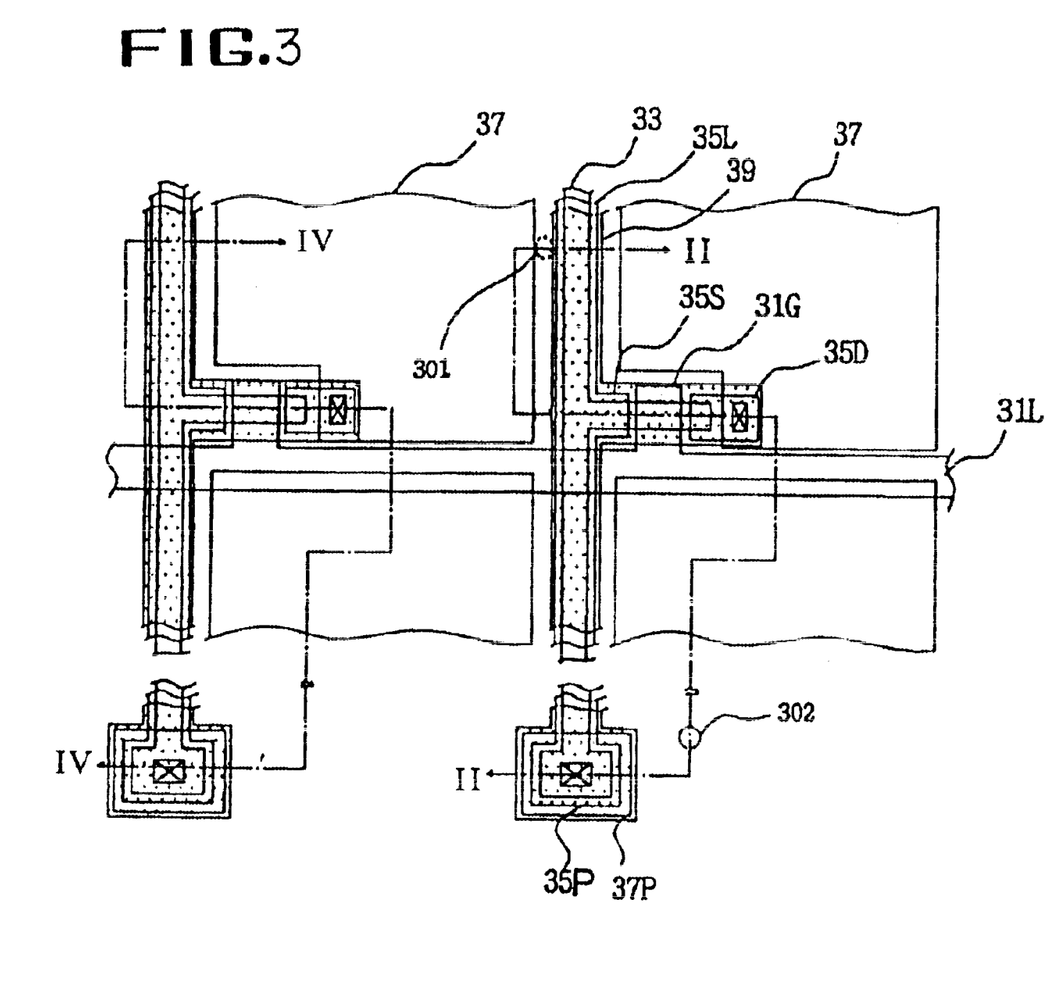
FIG. 3 shows a layout for explaining a method of removing pattern defects in an LCD according to a first embodiment of the present invention.
Figure 4A:
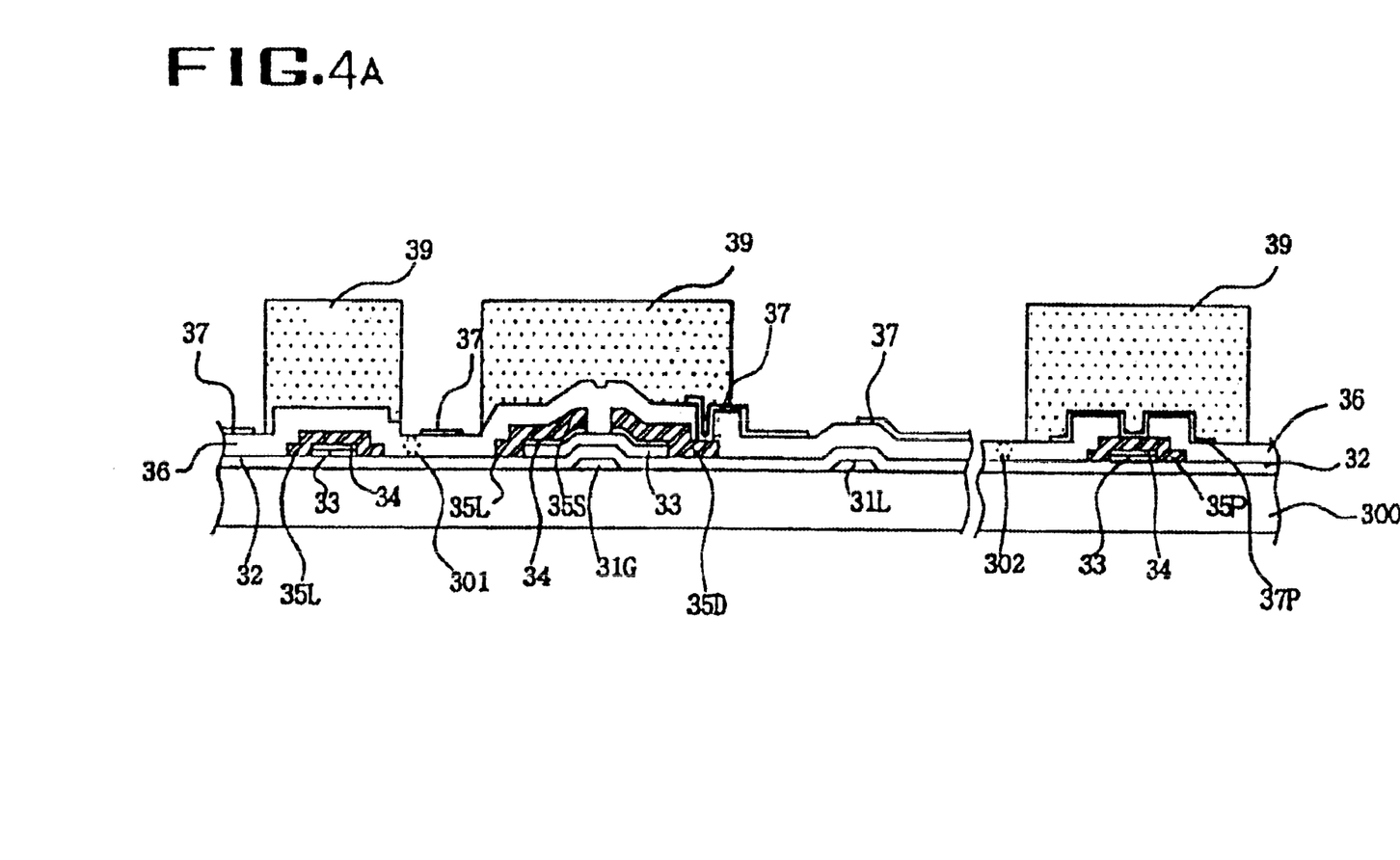
Figure 4B:
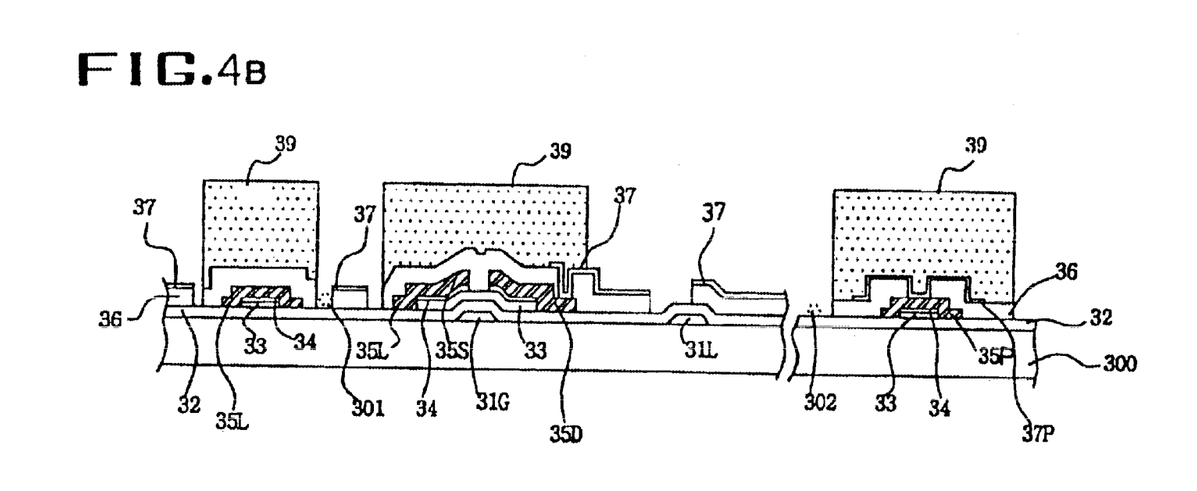
Figure 4C:
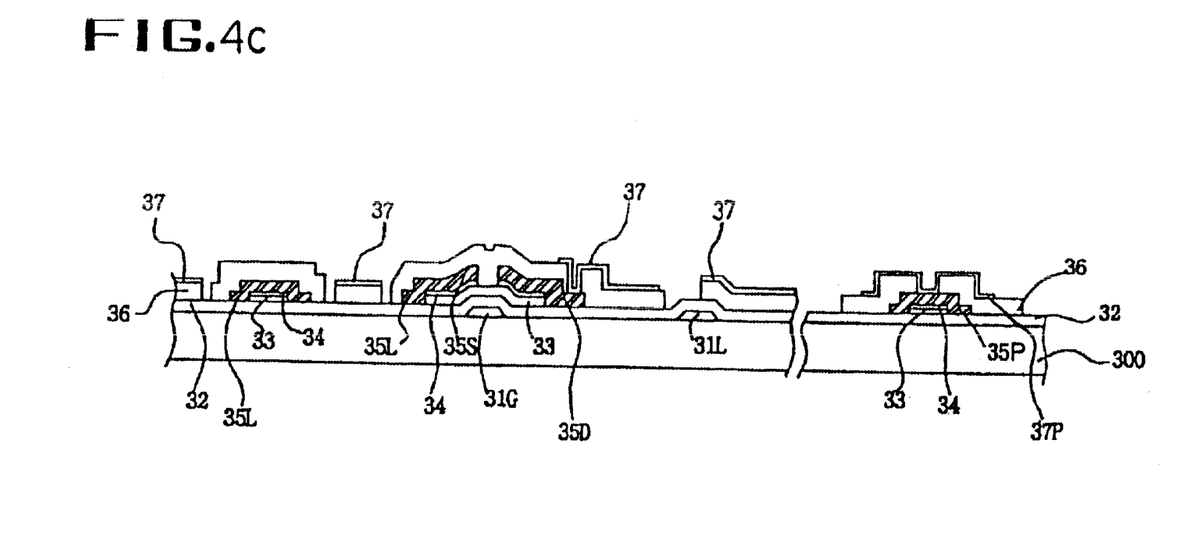

FIG. 3 shows a layout for explaining a method of removing pattern defects in LCD according to a first embodiment of the present invention, and FIG. 4A to FIG. 4C show cross-sectional views bisected along with the cutting line II—II in FIG. 3 for illustrating a to process of removing pattern defects in an LCD wherein the steps of removing pattern defects are shown in order.

In the following description of the embodiment, a transparent conductive layer lies on a passivation layer, which is a so-called IOP structure, and an active layer pattern follows a data line.

Referring to FIG. 3, a plurality of pixel cells are defined by gate lines 31L and data lines 35L, which cross one another. A TFT and a pixel electrode 37 are formed in each pixel cell, and a data signal transmitted through the data line 35L is transferred to the pixel electrode 37 by switching characteristics of the TFT.

As shown in FIG. 4A, a gate wire, including a gate electrode 31G and a gate line 31L, is formed on a substrate 300, and a gate insulating layer 32 covers an exposed surface of the substrate including the gate wire. In this case, a gate wire of at least one layer may be formed.

When a double-layered gate wire is formed, the first layer is formed of Al, which has excellent electrical conductivity, and the second layer is formed of a conventional metal, such as Mo, Cr, Ta and the like.

An active layer 33, which follows along with the data line 35L, is formed on the gate insulating layer 32 over the gate electrode 31G.

A data wire is formed over the substrate including the active layer 33. The data wire consists of the data line 35L crossing with the gate line 31L to define a plurality of pixel cells, a source electrode 35S protruding out from the data line 35L, a drain electrode 35D standing face to face opposite the source electrode 35S, and a data pad 35P at the end of the data line 35L.

In this case, the data wire, which comprises of the source electrode 35S, drain electrode 35D, data pad 35P, and data line 35L, of at least one layer may be formed. When a double-layered data wire is formed, the first layer is formed of Al, which has excellent electrical conductivity, and the second layer is formed of a conventional metal, such as Mo, Cr, Ta and the like. An ohmic contact layer 34 made of a semiconductor layer doped with impurities may be formed at an interface between the data wire and the active layer 33 to improve contact resistance.

A passivation layer 36 covers an exposed surface of the structure, except for the drain electrode 35D and data pad 35P. A pixel electrode 37 connected to the drain electrode 35D, and a data wire covering layer 37P covering the data pad 35P, are formed on the passivation layer 36. The data wire covering layer 37P may be formed of a transparent conductive substance used for the pixel electrode 37.

In the above-structured LCD, pattern defects may be generated as a portion of the active layer or data wire pattern remains at the area between the data line 35L and pixel electrode 37, or the space between the data pads 35P (i.e. between the wires). The pattern defects 301 and 302 are marked on the layout and cross-sectional views.

The active layer pattern defect may be formed when a semiconductor layer having been formed on the gate insulating layer 32 is etched by photolithography. And, the data wire pattern defect may be formed when a conductive layer having been deposited for a data wire on the gate insulating layer 32 and active layer 33 is patterned by photolithography. Remaining unwanted locations of electrically-conductive pattern defects generated from the active layer or data wire may degrade or impair the electrical function of performance of the LCD. Therefore, a process for removing the pattern defects is required.

The present invention provides a technique which removes the active layer and/or data wire pattern defects simultaneously, by forming an etch-stop layer 39 which covers the wires of the LCD having the structure of the related art, exposing the pattern defects 302 and 303 on the gate insulating layer 32 in the air by etching the passivation layer, using the etch-stop layer 39 as an etch mask, then removing the pattern defects by carrying out an etching process.

FIG. 4A to FIG. 4C show cross-sectional views bisected along with the cutting line II—II in FIG. 3 for illustrating a process of removing pattern defects in LCD.

Referring to FIG. 4A, a photoresist pattern 39 is formed over an exposed surface of a substrate 300. The photoresist pattern 39 is formed to cover a data wire and a TFT. Namely, the photoresist pattern is formed to fully cover a data line 35L, source electrode 35S, drain electrode 35D, a channel region 33C, and data covering layer 37P. An overall figure of the photoresist pattern 39 is well shown in the layout of FIG. 3. The photoresist pattern 39 does not cover the pattern defect 301 which may exist between the data line 35L and pixel electrode 37 or/and the other pattern defect 302 which may exist between the data pads 35P.

Referring to FIG. 4B, an exposed portion of the passivation layer 36 is etched away by an etchant such as an etching gas or an etching solution which can etch the passivation layer. When the passivation layer 36 is made of silicon nitride, the etchant is preferably one of mixed gases and solutions, such as $SF_6+O_2/He$, $C_2F_6+O_2$, ammonium fluoride/HF, and the like for dry or wet etch.

In this case, the pixel electrode 37 made of ITO (Indium Tin Oxide) has low etch selectivity against the etchant which etches the passivation layer 36, working as an etch-stopping layer. Thus, a portion of the passivation layer 36 which is not protected by the photoresist pattern 39 and pixel electrode 37 is removed to expose the pattern defects 301 and 302 on the gate insulating layer 32. Etching conditions are properly adjusted so as not to remove the gate insulating layer 32 while etching the passivation layer around the gate line 31L. Portions of the gate line 31L may be damaged in the following process if the gate insulating layer 32 near the gate line 31L is etched.

Referring to FIG. 4C, the exposed pattern defects are removed by a proper etching gas or solution. When the pattern defects are made of a substance used to form the active layer or data wire, an etchant which has a high etch selectivity to each of them is used for removal. The present invention by using an etch process, enables the removal of a number of pattern defects in short time, compared to the related art of using laser beams. Finally, the photoresist pattern is removed, and the substrate of a TFT LCD is prepared.

As the photoresist pattern 39 fully covers the data wire and TFT fully, the following benefits are provided. The channel region 33 is protected, since the TFT element is fully covered by the photoresist pattern 39. And, leakage current generated between the data line 35L and pixel electrode 37 due to particles produced from subsequent processes are reduced. Moreover, lift-off of the pixel electrode 37 or data covering layer 37P due to the undercut at respective steps is prevented during the removal of the pattern defects by having the step parts between the source and drain electrodes 35S and 35D, the active layer 33, and the data pad 35P fully covered by the photoresist pattern 39.

Figure 5:
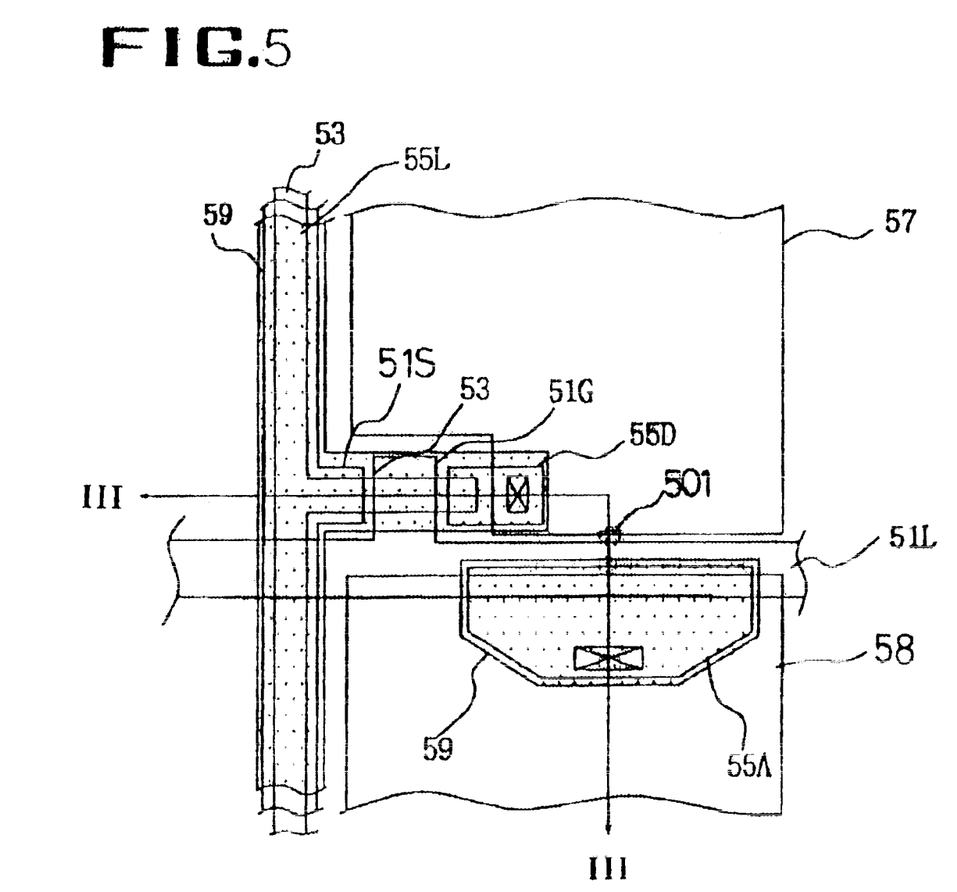
FIG. 5 shows a layout for explaining a method of removing pattern defects in LCD according to a second embodiment of the present invention.

FIG. 5 shows a layout for explaining a method of removing pattern defects in LCD according to a second embodiment, wherein the LCD includes on-gate storage capacitors. The LCD shown here has the IOP structure in which a transparent conductive layer lies on a passivation layer. Also, the layout shows an active layer lies along with the data line.

Referring to FIG. 5, a thin film transistor is constituted where the gate and data lines 55L and 51L respectively cross each other. The TFT comprises a source electrode 51S, a gate electrode 55G which is a portion of the gate line 55L, a drain electrode 51D standing face to face opposite the source electrode 51S, and an active layer 53 overlapped with these electrodes. The drain electrode 55D is connected to a first pixel electrode 57.

The gate line 51L selectively overlaps a second pixel electrode 58 in the neighboring stage, forming an on-gate storage capacitor. As the gate line 51L is unable to sufficiently overlap the second pixel electrode 58, in this case, a subsidiary electrode 55A connected to the second pixel electrode 58 is formed over the pixel electrode 57 to be overlapped by the gate line 51L. Therefore, the storage capacitance is increased to be proportional to the amount of area that the gate line 51L overlaps the subsidiary electrode 55A.

Reference the numeral 59 indicates an etch-stop layer which covers the data line 55L and TFT element completely.

The second embodiment provides a technique which removes the pattern defect 501 such as the active layer and/or data wire pattern defects simultaneously, by forming an etch-stop layer 59 which covers the data wire (including the data line 55L and subsidiary electrode 55A) of the LCD by exposing the pattern defect 501 on the gate insulating layer, using the air by etching the passivation layer, using the etch-stop layer 59 as an etch mask, then removing the pattern defects by carrying out an etching process.

Figure 6A:
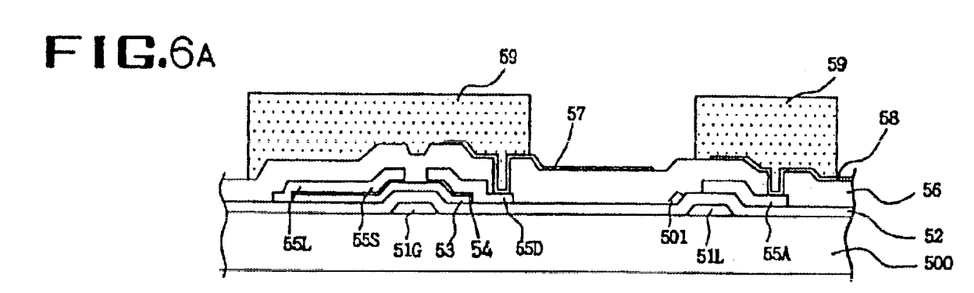
Figure 6B:
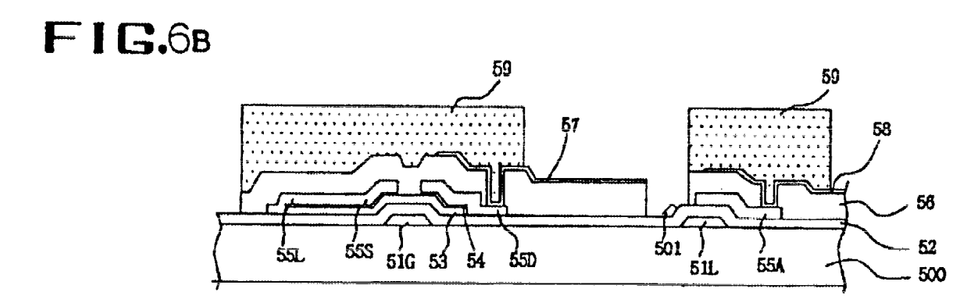
Figure 6C:
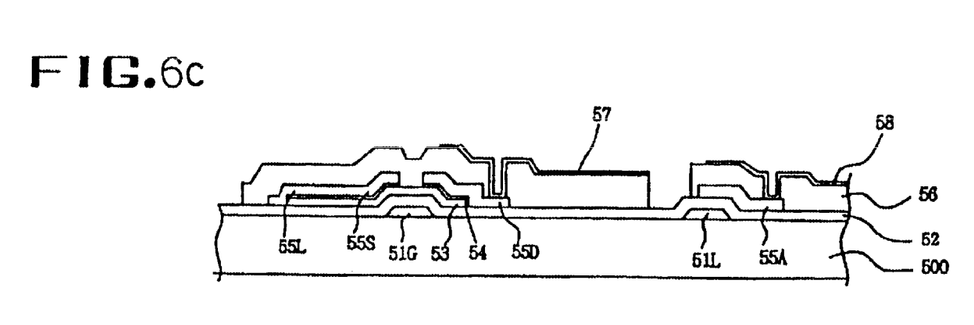

FIG. 6A to FIG. 6C show cross-sectional views bisected along with the cutting line III—III in FIG. 5 illustrating a process for removing defects in an LCD. The cross-sectional views illustrate only part of the structure of a conventional IOP typed LCD.

Referring to FIG. 6A, a photoresist pattern 59 is formed over an exposed surface of a substrate 500. The photoresist pattern 59 is formed to cover a data wire including a data line, 55L TFT, and subsidiary electrode 55A. An overall figure of the photoresist pattern 59 is well shown in a layout of FIG. 5. The photoresist pattern 59 exposes the pattern defect 501 existing at the space between the data line 55L and pixel electrode 57 or/and between the subsidiary electrode 55A and pixel electrode 57 so as not to block the pattern defect 501. Referring to FIG. 6B, an exposed portion of the passivation layer 56 is etched away by an etchant, such as an etching gas or an etching solution, which can etch the passivation layer 56. When the passivation layer 56 is made of silicon nitride, the etchant is preferably one of mixed gases or solutions such as $SF_6+O_2He$ or $C_2F_6+O_2$, ammonium fluoride/HF, and the like, for dry or wet etch.

The pixel electrode 57 made of ITO (Indium Tin Oxide) has low etch selectivity against the etchant which etches the passivation layer 56, working as an etch-stopping layer. Thus, a portion of the passivation layer 56 which is not protected by the photoresist pattern 59 and pixel electrodes 57 and 67 is removed to expose the pattern defects 501 on the gate insulating layer 52.

The etching conditions are properly adjusted so as not to remove the gate insulating layer 52 while etching the passivation layer around the gate line 51L. Portions of the gate line 51L may be damaged in the following process if the gate insulating layer 52 near the gate line 51L is etched.

Referring to FIG. 6C, the exposed pattern defect is removed by proper etching gases or solutions. When the pattern defect is made of a substance used to form the active layer or data wire, an etchant which has a high etch selectivity to each of them is used for removal.

Finally, the etch-stop layer is removed.

The second embodiment enables the removal of a number of pattern defects quickly, compared to the related art of using laser beams, by using an etch process.

The first and second embodiments provide an etch-stop layer to cover the data line/TFT element, or the data wire element such as the subsidiary electrode of a storage capacitor, as examples. In this case, the pixel electrode works as additional etch-stop layer during the process of etching the passivation layer.

However, in some cases a new etch-stop layer may be needed because a portion of the pixel electrode may be damaged by the etchant, or "lift-off" may occur due to over-etch under the pixel electrode. Thus, a third embodiment of the present invention will meet that need.

Figure 7:
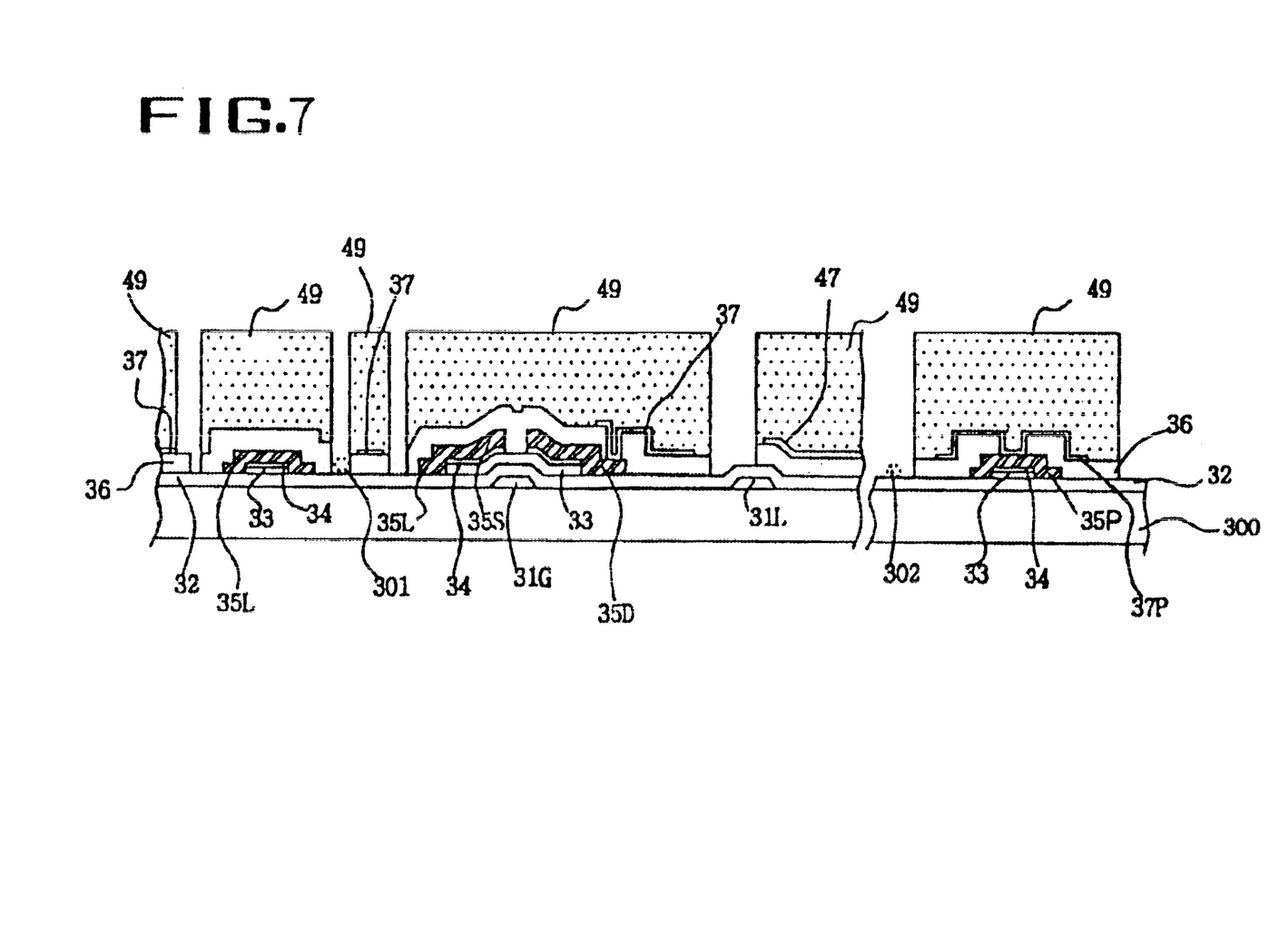
FIG. 7 shows a cross-sectional view of an LCD according to a third embodiment of the present invention.

FIG. 7 shows a cross-sectional view illustrating a method of an LCD according to a third embodiment, wherein an etch-stop layer is formed sufficient to cover a pixel electrode. The drawing illustrates the LCD structure as in the first embodiment, to explain the third embodiment, and the same numerals designate the same elements in the drawings.

The third embodiment is different from the first in that an etch-stop layer 49 covers pixel electrodes 37 and 47 as well as the data line and TFT element. Compared to first and second embodiments, the third embodiment has the advantage that a passivation layer 36 beneath the pixel electrodes 37 and 47 is protected when the pattern defects 301 and 302 are exposed to be removed. Namely, "lift-off" of the pixel electrodes due to over-etch of the passivation layer is prevented as the passivation layer is etched, using the etch-stop layer 49, which is wider than the pixel electrodes, as an etch mask. According to another technique, the pattern defects are removed by forming an etch-stop layer which covers all wires in an LCD except the sites between wires, by etching a passivation layer which is hot covered by the etch-stop layer to expose the pattern defects, then by removing the pattern defects. According to still another technique, the pattern defects are removed by exposing the pattern defects by etching a passivation layer selectively, then by etching the pattern defects away.

Accordingly, pattern defects which exist widely as well as locally, are quickly removed, thereby increasing productivity. Moreover, pattern defects are removed without causing any damage on other parts of the LCD, as the parts necessary for operating the LCD are covered by a passivation layer during the etching process of removing the pattern defects.

It will be apparent to those skilled in the art that various modifications and variation can be made in the liquid crystal display and method of removing pattern defects thereof of the present invention without departing from the spirit or scope of the invention. Thus, it is intended that the present invention cover the modifications and variations of this invention provided they come within the scope of the appended claims and their equivalents.

What is claimed is:

1. A method of removing pattern defects in a liquid crystal display, wherein the liquid crystal display comprises:
    a gate wire on a substrate, the gate wire including a gate electrode and a gate line;
    a gate insulating layer covering an exposed surface of the substrate, including the gate wire;
    a data wire on the gate insulating layer, the data wire including a data line, a source electrode, and a drain electrode;
    an active layer on the gate insulating layer, the active layer constituting a thin film transistor with the gate, source, and drain electrodes;
    a passivation layer covering an exposed surface of the substrate, except for an exposed portion of the data wire; and
    a pixel electrode on the passivation layer, the pixel electrode connected to the exposed portion of the data wire, the method comprising:
        forming an etch-stop layer covering the data wire and the thin film transistor, the etch-stop layer covering a portion of the pixel electrode, and the pixel electrode has a function as an additional etch-stop layer;
        exposing at least one pattern defect by etching the passivation layer, using the etch-stop layer and pixel electrode as an etch mask, wherein the etch-stop layer and the pixel electrode function together and simultaneously as a composite etch-stop layer;
    removing the pattern defect; and
    removing the etch-stop layer;
    having a feature that a pixel electrode is formed on an upper surface of a passivation layer.

2. The method of removing pattern defects in a liquid crystal display according to claim 1, wherein the etch-stop layer covers the pixel electrode.

3. The method of removing pattern defects in a liquid crystal display according to claim 2, wherein the pattern defect is generated from residue of a substance used to form the active layer.

4. The method of removing pattern defects in a liquid crystal display according to claim 2, wherein the pattern defect is generated from residue of a substance used to form the data wire.

5. The method of removing pattern defects in a liquid crystal display according to claim 3, wherein the pattern defect is removed by etching.

6. The method of removing pattern defects in a liquid crystal display according to claim 1, wherein the data wire includes a data pad connected to an end of the data line.

* * * * *